United States Patent [19]

Schmidt

[11] Patent Number: 4,854,698

[45] Date of Patent: Aug. 8, 1989

[54] 3-D MEASUREMENT VIA MULTIPLE GATING

[75] Inventor: Richard Q. Schmidt, Huntington, N.Y.

[73] Assignee: Robotic Vision Systems, Inc., Hauppauge, N.Y.

[21] Appl. No.: 105,592

[22] Filed: Oct. 5, 1987

[51] Int. Cl.[4] .................... G01C 3/08; G01B 11/24; H04N 3/12

[52] U.S. Cl. ........................... 356/5; 356/152; 356/376; 250/332; 250/334; 250/578; 358/96; 358/212

[58] Field of Search ............... 356/5, 376, 152; 250/332, 334, 578; 358/96, 213.29, 212

[56] References Cited

U.S. PATENT DOCUMENTS

| | | | |
|---|---|---|---|
| 3,682,553 | 8/1972 | Kapany | 356/5 X |
| 3,743,419 | 7/1973 | Skagerlund | 356/5 |
| 3,899,250 | 8/1975 | Bamberg et al. | 356/5 |
| 3,902,803 | 9/1975 | Lego, Jr. | 356/5 |
| 3,962,577 | 6/1976 | Lindley et al. | 250/578 X |
| 4,129,780 | 12/1978 | Laughlin | 356/5 X |
| 4,199,253 | 4/1980 | Ross | 356/5 |
| 4,529,886 | 7/1985 | Yokoyama et al. | 250/578 |
| 4,634,272 | 1/1987 | Endo | 356/5 |
| 4,641,038 | 2/1987 | Baker | 358/212 X |
| 4,708,473 | 11/1987 | Metzdorff et al. | 356/5 |
| 4,727,259 | 2/1988 | Halvis | 356/5 X |

Primary Examiner—Thomas H. Tarcza
Assistant Examiner—Linda J. Wallace
Attorney, Agent, or Firm—Max Fogiel

[57] ABSTRACT

An arrangement for gating receivers of electro-magnetic energy where optical gating means are not available or not as advantageous as gating the detector array outputs. Appropriate passive and active discharge paths for the detecting elements are provided. Path isolation means are provided for interconnecting detector and memory elements. The gated receivers are applied to obtaining 3-D surface measurements based on the time of flight of a transmitted energy pulse.

10 Claims, 3 Drawing Sheets

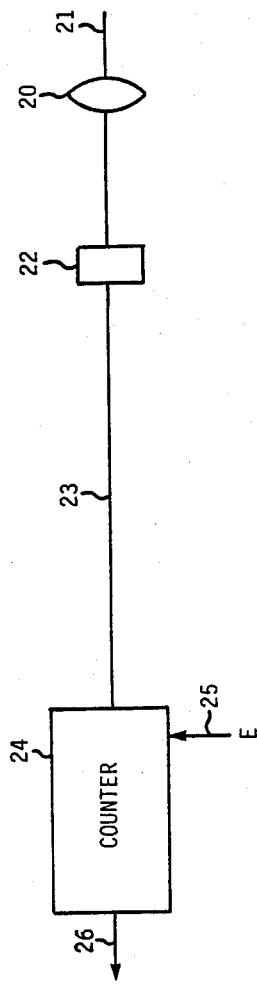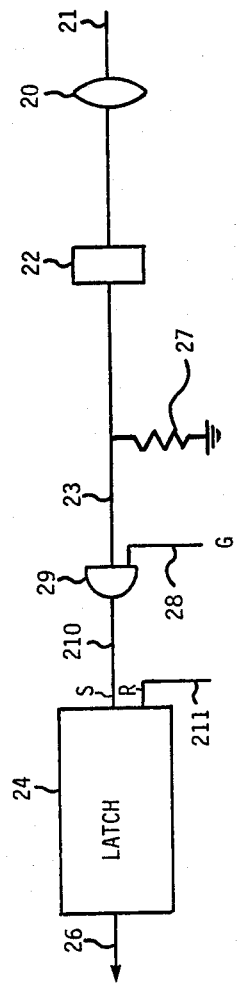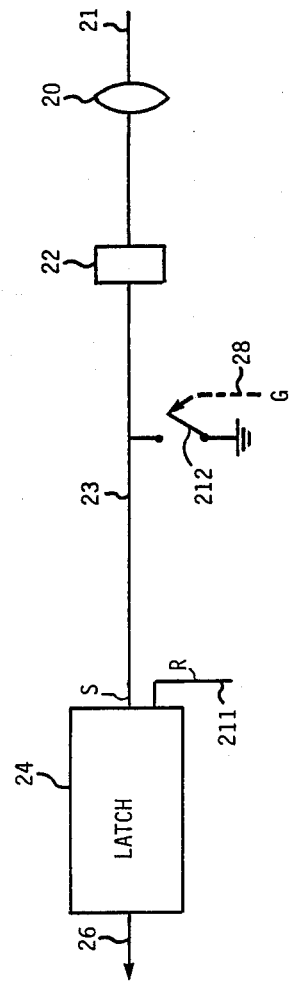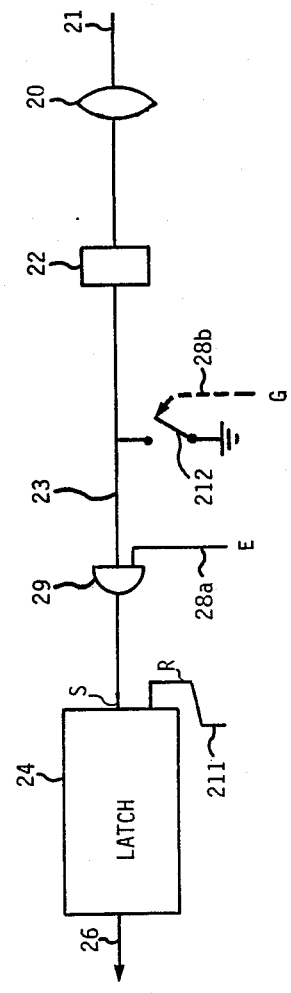

3-D MEASUREMENT VIA MULTIPLE GATING

BACKGROUND OF THE INVENTION

A method of measuring the three dimensions of a point on a surface based on the time of flight of light as disclosed in U.S. Pat. No. 4,199,253. Shuttering of the received light, such as could be obtained by gating a micro-channel plate on and off, enabled the identification of the time required for a light pulse to travel to the surface, reflect for the surface, and travel to the receiver. It was shown how a single light pulse with multiple receivers in parallel could make this measurement. And it was shown how a single receiver with multiple light pulses could make this measurement.

Optical gating components with the requisite switching speed (light travels round trip in about 2 nanoseconds to a target 1 foot away) have been costly and require relatively high switching voltages. Also, needed components are not available at all frequencies. For example, at $10\mu$ meter wavelengths, microchannel plate amplifiers are not available to provide the gating function. It is therefore desirable to provide the same measurement capability without the need for such components.

SUMMARY OF THE INVENTION

It is an object of the present invention to overcome the prior art disadvantages.

In particular, it is the object of the present invention to provide a method and arrangement for making three-dimensional surface measurements using a transmitted pulse of radiant energy and measuring and reflected energy time and angle of return. An encoded method of time measurement is used to simplify the implementation. Both single pulse, multi-detector and multiple pulse, single detector methods are disclosed.

In keeping with this object and with still others which will become apparent as the description proceeds, the important characteristics of the invention are: compatibility with integrated circuit technology, reduced complexity, reduced amount of required high frequency circuitry, and adaptability to long wave radiation technology.

In a first preferred embodiment, a single pulse of radiation is projected on the object to be measured and the received signal is processed by parallel-gated channels. The projected pulse should be short relative to the desired resolution in depth (6" per nsec). A separate channel is set up to receive the reflected pulse for each term in a code. For N terms, as many as $2^N-1$ unique distances can be resolved by the code. Each of the channels is gated by a pattern representing a code term versus time. The channel outputs are then examined and the code formed by the channels detecting the presence of a pulse can be interpreted to represent the measured depth. By providing an array of channels, the angle to the surface(s) can also be determined.

In a second preferred embodiment just one gated receiver channel is required for each angle determination. However, one pulse must be transmitted and processed by the receiver for each term in a code of N terms that divide the usable measurement range into as many as $2^N-1$ resolvable distances. The projected radiation pulse, as in the first embodiment, should be short compared to the desired resolution in depth. For each transmitted pulse the receiver is gated by a pattern representing a code term versus time. The receiver output is examined for each transmitted pulse and the code formed by the detected pulses are interpreted as a measurement of distance to a surface. By using an array of detectors many angles and distances to a surface(s) may be simultaneously determined.

In each embodiment, if it is only necessary to determine the closest surface to an array element, then the transmitted radiant pulse may be longer than the desired depth resolution. However, the additional projected energy is wasted since the measurement will select the earliest returned pulse as the nearest surface. This may be necessary, however, if a pulse of sufficiently short duration is not readily producible.

It is also sometimes desirable in each embodiment to project and process additional codes to provide a measure of error detection and possible correction.

In one practice of the invention, a detector array is discharged during portions of the code when no signal is to be sought. The output during portions of the code when a signal is sought is used to set a recording device if the signal exceeds a predetermined theshold. In a second practice of the invention, a rate of discharge of the detector is selected that is compatible with the desired measurement resolution. The detector output is gated by a decoding waveform to allow an output only during periods of the code when a signal is sought. If the gated output exceeds a predetermined threshold, a recording device is set to a state indicating signal reception.

In a third embodiment of the invention, the detector array is continuously discharged until the time representing the minimum time of an expected return signal. Thereafter, if the detector output reaches a predetermined threshold prior to a designated time, the signal is known to reside within the range determined by the enabled detector time. By using a method comparable to binary search, the distance can be resolved to one part in $2^N-1$ divisions, with N projectes pulses of unrestricted length. Unrestricted length is possible if the first half of the unresolved range is examined for the pulse presence in each projection case.

The invention will hereafter be described with reference to an exemplary embodiment, as illustrated in the drawings. However, it is to be understood that this embodiment is illustrated and described for the purpose of information only, and that nothing therein is to be considered limiting of any aspect of the invention.

BRIEF DESCRIPTION OF THE DRAWINGS

FIG. 2a is a schematic representation of a receiver using a counter to determine time of pulse arrival;

FIG. 2b is a schematic representation of a receiver using a resistive discharge path with gating;

FIG. 2c is a schematic representation of a receiver using a switched discharge path of the detector;

FIG. 2d is schematic representation of a receiver using a switched discharge path that must go to more than one storage location;

FIG. 2e is a schematic representation and shows the elements of FIGS. 2b–2d when arranged as arrays with multiple parallel identical paths:

FIG. 5a is a schematic representation of a microchannel gated receiver using a resistive discharge path;

FIG. 5b is a schematic representation of a microchannel gated receiver using a switched discharge path of the detector; and FIG. 5c is a schematic representation of a microchannel gated receiver using a switched discharge path that must go to more than one storage location.

DESCRIPTION OF THE PREFERRED EMBODIMENTS

Figure 1:
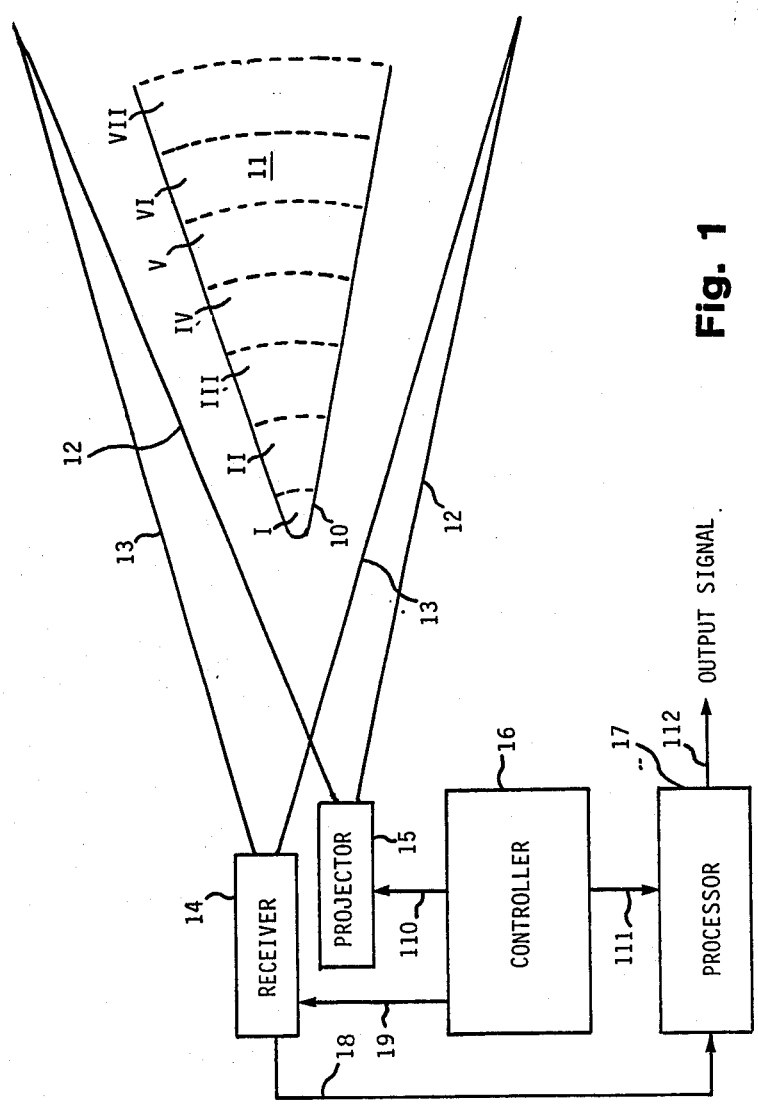
FIG. 1 is a schematic diagram of a system employing the concepts of the present invention.

Object 10 with surface 11 is to be measured to develop a database of three-dimensional measurements of the surface 11 or, in a simpler application, to just detect the presence of object 10 and report its location in 3-D space. Projector 15 projects a pulse of radiation (preferably in the visible or infrared portion of the spectrum) in the direction of object 10 within projector beam boundaries 12. Objects within the projector beam will reflect some of the radiation, a portion of which will be collected by receiver 14 having receiver beam boundaries 13 encompassing projector beam 12.

Controller 16 maintains the timing of the system. Controller 16 signals projector 15 via line 110 to project a radiation pulse which travels to object 10, reflects from object 10 and has a portion traveling to receiver 14. Controller 16 enables receiver 14 via line 19 to begin processing detected signal power from the earliest expected time of arrival until the last expected time of arrival based on the known velocity of radiation and the range of interest. A signal is sent from receiver 14 via line 18 to processor 17; the signal contains information concerning the presence or absence of a detected signal versus time from which processor 17 can develop the desired 3-D measurement data.

Processor 17 receives reference timing signals and commands from controller 16 via line 111, and provides output signal 112 containing the measurement data representing points on surface 11.

When projector 15 projects a pulse of radiation that reflects off object 10, a lens 20 contained in receiver 14 and shown in FIG. 1, collects a portion of the reflected energy and directs it to detector 22. Detector 22 may be an array of detecting sites, such as a solid state TV camera chip, upon which lens 20 images surface 11 of object 10. Detector 22 is preferably centered on optic axis 21 of lens 20.

A brute force method of detecting the time of flight of the projected pulse is shown in FIG. 2a. Controller 16 via line 19 proivdes an enable signal 25 to counter 2 prior to the earliest expected arrival of the projected pulse (minimum round trip distance divided by the velocity of propagation). When disabled, the counter is preset to a given value, from which it counts up (or down) when enabled, and stops upon arrival of the detected pulse on line 23. The count thus represents time of arrival and can be read out via output line 26. The disadvantages of this method is that a separate counter is required for every detector site in the array and the counters must operate at a very high frequency to provide high resolution in the measurement. Enable signal 25, however, may be common to all counters.

A less complex method using just a high frequency latch and gate for every detector site is shown in FIG. 2b. A discharge resistor 27 for each detector site is selected to optimize the detector sensitivity and resolution, and is attached to detector 22 site output 23. AND gate 29 provides a high impedance input for line 23 or must be buffered (the input impedance may be made a portion of effective load resistor 27). Controller 16 via line 19 eanbles AND gate 29 via signal 28 during any interval in which detection of the reflected pulse is to be recorded. If the detected signal 23 exceeds a given threshold during any interval in which AND gate 29 is enabled by signal 28, its output 210 sets a latch circuit 24 to a signal "detected" state that can be read out on output line 26. Signal 28 may be common to all gates in the array. Prior to each use, latch 24 is reset to the signal "not detected" state by signal 211 from controller 16 via line 19. The latch is not reset during the possible time of arrival of the measurement pulse, so if a pulse is detected during any one period of the AND gate, that information is retained until readout on line 26. Signal 211 may be common to all latches in the array.

FIG. 2c provides an alternate method in which each detector site in detector 22 is continuously discharged via individual switches 212 except during those intervals during which controller 16 provides signal 28 via line 19 to open switches 212 to allow detection of a reflected radiation pulse by detector 22. If, during the interval that switches 212 are open, any detector 22 site output 23 exceeds a predetermined threshold, then, the corresponding latch 24 is set to the detected signal state. Latch 24 is reset prior to the minimum expected pulse time and retains the reset or detected signal state until read out on line 26. Reset signal 211 is provided via line 19 of controller 16 and may be common to all latches. Signal 28 also may be common to all switches 212.

FIG. 2d is similar to 2c but this arrangement allows each detector site in detector array 22 to drive more than one memory element. AND gate 29 provides isolation between detector output 23 and latch 24 input 210 so that other AND gates and latches can be driven by detector output 23 as controlled by separate AND gate 29 gating signals 28a provided by contoller 16 via line 19. AND gate 29 may be built into the latch as an enabling gate. Gate signal 28b functions as signal 28 in FIG. 2c.

It should be noted that the signal gating of FIGS. 2b and 2c is comparable to gating the reflected pulse energy prior to lens 20. This method is preferably when optical gating is not possible or practical. This method is compatible with current circuit fabrication technology.

The lateral dimensions of surfaces image on detector 22 are directly proportional to the distance of the surface from the node of lens 20. Each detector site on detector 22 represents a unique angle through the lens 20 node to the surface and thus can provide a complete three-dimensional measurement once the distance to the surface is determined from the pulse time of flight.

To explain the method of determining the time of flight, we refer to FIG. 1 and sections 1 through VII on object 10 that represent equidistant locations from the projector 15. If each section is six inches wide (in the direction of travel of the projected pulse) then the pulse will traverse each boundary about $\frac{1}{2}$ nsec apart (in air). The reflected energy from the further boundary of a section takes another $\frac{1}{2}$ nsec to traverse back to the nearer boundary of that section so that the reflected energy from that section is stretched out over 1 nsec, in addition to the nominal duration of the projected pulse. If a 1 GHz counter is stopped when a reflected pulse is received as in FIG. 2a, then the distance to the surface is directly related to the count at 6 inches/count.

If gated detectors, such as shown in FIGS. 2b, c, or d, are used, then there is insufficient information provided by one pulse and one detector unless the gate is activated just as the received pulse arrives by a gate produced at a known time. For instance, if we only wanted to know what surface of object 10 was in regions I through VII of FIG. 1, we could transmit one pulse and receive the reflected energy through seven parallel receivers, with each receiver gated on during one of the seven intervals. Each receiver would have a certain group of detector sites in an array detector reporting a signal detected. The detected signals would all derive from the sections I to VII at a distance corresponding to the time of flight equal to the time the gate followed the projection of the pulse. If the cone 10 is seen head on, each section I through VII would image as a ring on the detector 22 array surface. The same result could be obtained by transmitting a pulse seven times and using one receiver gated after delays corresponding to time of flight delays to reach and return from sections I through VII.

If the number of distances to be resolved is increased to a much larger number, then the first method requires an abnormally high complexity and the second method requires an abnormally long time to complete. The present invention provides a method for reducing these adverse conditions.

Figure 3:
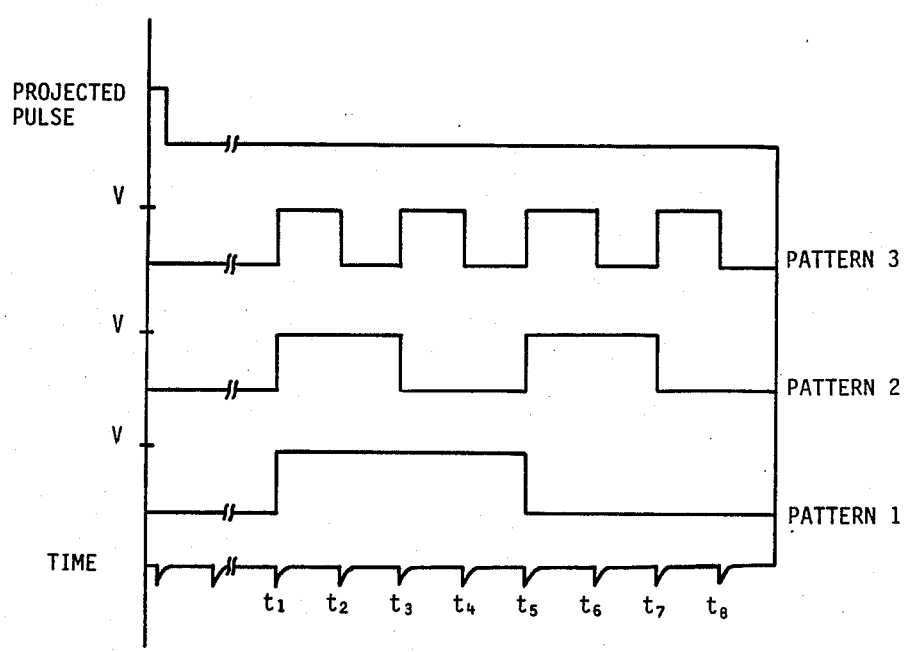
FIG. 3 is a timing diagram for parallel receiver processing.

In the first method N parallel receivers (type of FIGS. 2b or 2c) are required to provide up to $2^N-1$ resolvable distance increments. FIG. 3 provides the timing diagram for resolving $2^3-1=7$ sections with just 3 parallel receivers. A pulse is projected at a reference start time. At a known time, $ti_1$, after projecting the pulse, gating patterns 1-3 are applied to the 3 receivers. The receiver gating Pattern 1 will only record data from surfaces in Sections I-IV corresponding to times $t_1$ to $t_5$. The receiver gating Pattern 2 will only record data from surfaces in Sections I, II, V, VI. Looking at the result of Pattern 1 receiver alone, if data is recorded, then that data is only known to be in Sections I-IV. However, if that data is looked at in conjunction with data from Pattern 2, we can declare that any detector site reporting in both data sets must be in Sections I-II; the leftover data of Pattern 1 sites must be in Sections III-IV and the left over data of Pattern 2 sites must be in Sections V-VI. We have thus doubled the resolution by adding a second pattern. Following the same logic with Pattern 3 data in conjunction with the conclusions already reached with Patterns 1 and 2 data, we can double the resolution one more time and differentiate the Section I data from Section II data. Likewise, data from Sections III-IV can be split and Sections V-VI can be split. The leftover data of Pattern 3, therefore, must belong to Section VII. Thus the seven distance intervals measurable by the sensor have been encoded by the patterns in a manner that enables decoding up to $2^N-1$ intervals with N-receivers each gated by one of the patterns and operating on the reflected energy of a single projected pulse. This is particularly valuable if rapid measurement is required or the object being measured is moving.

Figure 4:
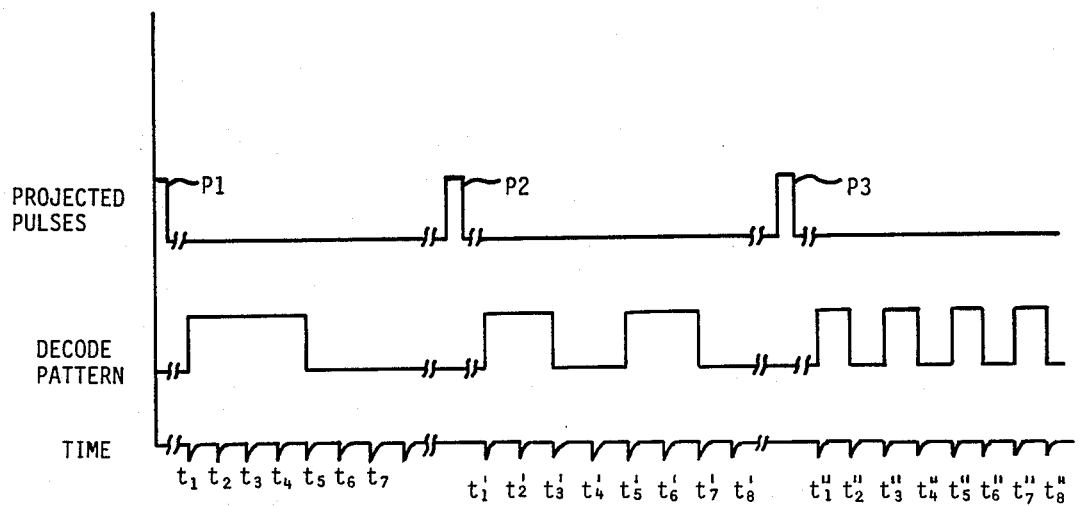
FIG. 4 is a timing diagram for serial receiver processing.

For relatively static objects and less costly implementation a second method of encoding distance requires only one receiver, but N pulses must be projected and processed serially to resolve up to $2^2-1$ distance intervals. FIG. 4 provides the timing diagram to resolve the same seven distance sections I-VII of FIG. 1. A first pulse of radiation is projected, making the zero distance time of flight reference. At the prescribed time $t_1$ corresponding to the round trip time of flight for the start of Section I reflect energy, the receiver is gated by one of the encoding patterns. The data collected must be stored for later comparison with data gathered by gating with a different pattern. One bit of storage for each detector site of the detector array is sufficient since we need only to indicate presence or absence of data for each pattern. Thus N-1 bits of storage is required if the final pattern is combined with the prior results in real time. N bits of storage for each detector site are required if the final result is to be stored.

When the reflected energy of the first pulse has been processed, a second pulse is projected, marking a second zero time reference and the receiver is gated with a second pattern starting at time equal to $t_1'$, the expected time of arrival of energy from the start of Section I. The data representing presence indications for each detector site, is stored as a second bit in the memory storage (type of FIG. 2b or 2d). The process is repeated for the final projected pulse with the receiver gating starting at time equal to $t_1''$, the expected time of arrival of energy from the start of Section I. Storing all three bits for each gated pattern automatically stores a code that is directly related to the Sections I-VII from which the data is derived. For the sequence shown all three bits will be set for data that is derived from Section I and just the bit corresponding to the last pattern will be set for data that is derived from Section VII. All bits in memory have to be reset prior to the measurement sequence.

A preferred pattern sequence order is shown in FIG. 4. Gating with the pattern having one contiguous "on" time provides an immediate classification of data as belonging to the smallest unambiguous range. By gating the closest distance "on" and furthest distances "off", the strongest signals are processed since signal strength diminishes with distance. By continuing the sequence in this manner, building up to finer and finer resolution, it is possible to gradually narrow the unambiguous distance designation with each pulse projected, rather than wait for completion of all N pulses.

The timing waveforms of FIGS. 3 and 4 are idealistic and some effort must be expanded to resolve ambiguities introduced by actual waveforms. For example, the projected pulse width adds to the time of reflected energy. If a surface is located at a distance corresponding to a round trip time $\Delta$ less than $t_5$ in FIG. 3, and the projected pulse width is greater than $\Delta$, then data will likely record for all three patterns and the surface will be mistakenly identified as belonging to the $t_1$ to $t_2$ interval. Use of a gray code, well known in analog to digital conversion for this very same problem, is a potential solution. Gray codes only change one bit of the code for adjacent states and thus a pulse straddling two states will appear to be in just one of those states, limiting the magnitude of the error.

If the projected pulse cannot be made shorter than the desired resolution, then the time-encoded method should be applied to just locate the surfaces to the resolution possible. The remaining ambiguous region can be broken up into smaller single sample regions which will unambiguously locate the leading edge of the reflected energy pulse. Although more time is required because two steps are required, the detection equipment can be reused so that there is no requirement for additional hardware. Also, though the higher resolution requires a higher clock frequency or analog delays, the switching waveform frequency to the gates need not be increased.

The waveform needs only to have a transition from the "on" state to the "off" state at the end of the sampling interval. Since we are trying to detect the leading edge of the reflected energy, the waveform can be "on" for a substantial time prior to the end of the sample time without an adverse effect.

It should be noted that a combination of the parallel and serial processing methods can be combined to provide a system with compromised preformance and benefits lying between the two extremes.

The invention has been described and illustration with reference to an exemplary embodiment. It is not considered limited thereto, inasmuch as all modifications and variations which might offer themselves are intended to be encompassed within the scope of the appended claims.

From those applications in whcch the practice of U.S. Pat. No. 4,199,253 would be more suitably implemented by gating with a micro-channel plate ampilifier, the micro-channel plate amplifer would be placed between lens 20 and detector 22. In FIG. 2b the function of AND gate 29 would be replaced by the gating action of the micro-channel plate. Gate 29 would be deleted and enabling signal 28 would gate the micro-channel plate. Detector discharge could be accomplished by either resistor 27 as in FIG. 5a or a gated discharge as shown in FIG. 5b via switch 212.

Gating signals 58 and 28 in FIG. 5b may have the same time waveform.

Multiple memory arrays after the form given in FIG. 2d with multiple gates 29 and latches 24 for recording separately transmitted pulses would only require the relatively low frequency of gating on one set of latches for each pulse transmitted. Hence, the individual control signals 28a would be of lower frequency, and high frequency gating signals 58 would be confined to the gating of the micro-channel plate to time encode the received signal as shown in FIG. 5c.

What is claimed is:

1. A method of measuring the three-dimensional location in space of a point on an object's surface comprising the steps of: projecting a pulse of radiation; imaging the reflected energy of said pulse from a surface upon at least one detecting array, said array containing at least one detection site capable of reporting the presence of said reflected energy, said reporting forming a site report, gating each said site report, to a latching memory array, said memory array being reset to indicate no reported presence prior to said gating, each element of said memory array being connected to one of said detection sites, each said memory element storing a report energy presence when said report is gated to said element: gating said site reports via time encoded patterns; interpreting said stored reports according to said time encoded patterns to provide a distance measurement; and processing said distance measurement and known angles of detection site to said surface to provide lateral distance measurements in two directions, said known angles being obtained by calibration of said detecting array.

2. A method as defined in claim 1, wherein one said pulse of radiation is projected and as many detecting arrays are provided as there are said encoding patterns.

3. A method as defined in claim 1, wherein a plurality if said pulse of radiation are sequentially projected, said plurality corresponding in number to the number of encoding patterns, one said pulse being projected following each said gating of reflected energy of the prior pulse, said interpreting of said stored reports being made after the reflected energy of the last of said pulses has been gated.

4. A method as defined in claim 1, wherein one said pulse of radiation is projected and as many detecting arrays are provided as there are said encoding patterns, one said pulse being projected following each said gating of reflected energy of the pulse preceding immediately said pulse being projected and corresponding to the most-recently projected pulse, said interpreting of said stored reports being made after the reflected energy of the last of said pulses has been gated.

5. An arrangement for time-encoding detected data from an electro-magnetic energy sensing array comprising: a sensing array of detecting sites, each site having output means emitting an output signal; a passive discharge path from each detecting site output means of said sensing array for increasing detecting sensitivity and resolution; an array of AND gates for gating individually said output signal of each detecting site in accordance with a time-encoded pattern signal, the output signals from said detecting sites forming gated detecting site output signals; and an array of memory elements capable of being reset by a control signal and being set by said gated detecting site output signals, each memory element recording the gated output signal of one detecting site.

6. An arrangement for time encoding detected data from an electro-magnetic energy sensing array comprising: a sensing array of detecting sites, each site having output means emitting an output signal; an array of discharge paths gated in accordance with a time-encoded pattern signal, one from each detecting site output means of said sensing array; and an array of memory elements capable of being reset by a control signal and being set by said detecting site output signals, each memory element recording the output signal of one detecting site.

7. An arrangement for time encoding detecting data from an electro-magnetic energy sensing array comprising: a sensing array of detecting sites, each site having output means emitting an output signal; an array of discharge paths from each output means gates in accordance with a time-encoded pattern signal, the output signals from said detecting sites forming gated detecting site output signals; an array of AND gates for passing individually the output signal of each detecting site in accordance with a first control signal; and an array of memory elements capable of being reset by a second control signal and being set by said gated detecting site output signals, each memory element recording the gated output signal of one detecting site.

8. An arrangement for measuring the three-dimensional location in space of a point on an object's surface comprising: a gatable source of radiation; means for projecting said radiation; imaging means for receiving said radiation when said radiation is reflected from an object; a gatable micro-channel amplifier; controller means for gating said radiation source and said micro-channel amplifier; an electro-magnetic energy sensing array of detecting sites, each site having output means emitting an output signal; a passive discharge path from each detecting site output means of said sensing array; and an arry of memory elements capable of being reset by said controller means and being set by said gated detecting site output signals, each memory element recording the output signal of one detecting site.

9. An arrangement for measuring the three dimensional location in space of a point on an object's surface comprising: a gatable source of radiation; means for projecting said radiation; imaging means for receiving said radiation when said radiation is reflected from an object; a gatable micro-channel amplifier; controller means for gating said radiation source and said micro-channel amplifier; an electro-magnetic energy sensing array of detecting sites, each site having output means emitting an output signal; a gated discharge path from each detecting site output means of said sensing array, said gated discharge being controlled by said controller means; and an array of memory elements capable of being reset by said controller means and being set by said gated detecting site output signals, each memory element recording the output signal of one detecting site.

10. An arrangement for measuring the three-dimensional location in space of a point on an object's surface comprising: a gatable source of radiation; means for projecting said radiation; imaging for receiving said radiation when said radiation is reflected from an object; a gatable micro-channel amplifier; controller means for gating said radiation source and said micro-channel amplifier; an electro-magnetic energy sensing array of detecting sites, each site having output means emitting an output signal; a gated discharge path from each detecting site output means of said sensing array, said gated discharge being controlled by said controller means; at least two arrays of AND gates for passing individually the output signal of each said detecting site in accordance with control by said controller means; and an array of memory elements for each said array of AND gates capable of being reset by said controller means and being set by said gated detecting site output signals, each memory element recording the output signal of one detecting site.

* * * * *